United States Patent [19]

Capaul

[11] Patent Number: 5,202,174
[45] Date of Patent: Apr. 13, 1993

[54] LAY-IN CEILING PANEL

[75] Inventor: Raymond W. Capaul, Aurora, Ill.

[73] Assignee: Capaul Corporation, Plainfield, Ill.

[21] Appl. No.: 699,458

[22] Filed: May 13, 1991

Related U.S. Application Data

[62] Division of Ser. No. 639,877, Jan. 11, 1991.

[51] Int. Cl.⁵ .................... B32B 7/02; B32B 13/04; B32B 13/14; E04B 1/88
[52] U.S. Cl. .................... 428/138; 52/145; 156/39; 156/44; 156/291; 181/290; 181/291; 181/294; 428/44; 428/198; 428/201; 428/210; 428/215; 428/286; 428/311.5; 428/432; 428/703; 428/920
[58] Field of Search .............. 52/145; 156/39, 44, 156/291; 181/290, 291, 294; 428/138, 198, 201, 215, 286, 432, 703, 920, 311.5, 210

[56] References Cited

U.S. PATENT DOCUMENTS

| | | |
|---|---|---|
| 2,450,911 | 10/1948 | Park et al. .................... 428/311.5 |
| 3,422,920 | 1/1969 | Greason et al. . |
| 4,607,466 | 8/1986 | Allred .................... 428/311.5 |

FOREIGN PATENT DOCUMENTS 247862  2/1967  Australia .................... 156/42

OTHER PUBLICATIONS

U.S. Gypsum Products, Accessories & Systems (pp. 10, 14 and cover page); United States Gypsum Products Company, copyright 1992.

Primary Examiner—James C. Cannon
Attorney, Agent, or Firm—Wallenstein, Wagner, & Hattis, Ltd.

[57] ABSTRACT

A lay-in ceiling panel structure, comprising a glass fiber ply, a gypsum board, and a highly perforated vinyl lamina. The ceiling panel structure having noise and sound transmission reduction coefficients in the range of 0.85 to 0.95 sabins and 0.35 to 0.39 dbs respectively. This structure also provides good fire resistance, space efficiency, and a lower surface that is washable and pleasing to the eye. In addition, the glass fiber ply is secured to the gypsum board by droplets of glue which are spaced 1 to 2 inches apart and which are applied 4 to 6 inches away from the outer periphery of the gypsum board. Applying the glue in this way allows the glass fiber ply and vinyl lamina to lay flat even if the board is warped by water leaks, humidity or age.

5 Claims, 1 Drawing Sheet

LAY-IN CEILING PANEL

This is a divisional of copending application Ser. No. 07/639,877 filed on Jan. 11, 1991, now pending.

DESCRIPTION

1. Technical Field of the Invention

The present invention relates to a multilayered panel for use in conventional drop-type ceilings in which the panel is fire resistant and has good noise absorption and sound transmission coefficients, and in which the lower layer of the panel is unaffected by warpage in the upper layer.

2. Background Prior Art

Suspended or dropped ceilings are widely used in residential, commercial and industrial buildings. Ceiling panels which define this dropped ceiling are generally suspended by a grid-like support structure. This support structure is secured to the building frame and/or the existing ceiling of the room. The space between the dropped ceiling and the actual ceiling is used for enclosing electrical and communication cables, fire protection, conduits, and ventilation ducts.

A dropped ceiling is usually installed after temporary walls are erected to partition off work space. These walls do not extend from the floor to the actual ceiling, but instead, only go as high as the dropped ceiling. Therefore, oftentimes an open and unobstructed area remains above the dropped ceiling.

Panels used in dropped ceiling may be designed to serve a variety of functions. First, the panels may be designed to serve as an attractive means for concealing the ducts, wiring, plumbing, etc. located above the panels. The panels are attractive when viewed from below, because a decorative lamina is applied to the underside of the panel. This lamina may have a smooth or a textured surface which is pleasing to the eye.

Second, the panels are often designed to contain a material which allows the panel to serve as a fire barrier. Should a fire start in an enclosed room, the panels help contain the fire to that room by preventing the fire from entering the open area above the dropped ceiling. Thus, the fire is prevented from spreading over the wall of one room into another.

Next, panels have been designed to help create a quiet working atmosphere by absorbing undesired sound or noise produced in the room below. A panel's ability to absorb noise can be measured by its Noise Reduction (NR) coefficient. The larger this coefficient is for a given panel, the more noise the panel absorbs. For example, a panel with an NR coefficient of 0.99 sabins will absorb almost all the noise which comes in contact with the panel's surface.

Finally, panels have been designed to prevent noise from traveling from one room to another. This problem occurs when noise, which is not absorbed by the ceiling panel, passes through the panel and into the open space above the dropped ceiling. This noise may then travel into an adjacent room.

To overcome this problem, ceiling panels may be installed that inhibit transmission of noise through the panel. Thus, the noise generated in one room is prevented from entering the space above the dropped ceiling. A panel's characteristic to inhibit the transmission of noise is commonly measured by its Sound Transmission (ST) coefficient. The greater the ST coefficient of a given panel, the less sound or noise the panel will transmit.

Today, there is a need to produce a ceiling panel which possesses all four of the above characteristics. One situation which has given rise to this need is the current design of commercial and industrial work space. These work spaces are frequently designed to place open work areas next to enclosed rooms. As open work areas generally produce a great deal of noise, ceiling panels with a large NR coefficient are needed to keep the areas as quiet as possible. Yet, it is also necessary to have ceiling panels with a large ST coefficient in open work areas. This prevents noise from jumping over the walls and into enclosed rooms which are intended to be as quiet as possible.

A solution to the above problem is to combine several layers of materials for the purpose of achieving all desired ceiling panel characteristic. Still, the more layers which are required t o produce the desired ceiling panel, the greater will be the labor, material and manufacturing costs. Furthermore, these ceiling panels must be as space efficient as possible because shipping costs for these panels are often based on the bulk volume of the space taken up in transit. Thus, the problem becomes how to make an inexpensive, space efficient, fire resistant ceiling panel which provides both high NR and ST coefficients.

An additional problem faced by the ceiling panel industry is the untimely destruction of panels due to water leaks or humidity which cause the panels to warp around their edges. Once warped, the panels become unsightly and require the additional expense of early replacement.

The present invention is provided to solve these and other problems.

SUMMARY OF THE INVENTION

The present invention is a lay-in ceiling panel structure, comprising a fiber glass ply which is secured to a gypsum board. In the preferred embodiment, a highly perforated lamina is secured to the fiberglass ply on the side opposite that of the gypsum. This lamina provides the washable and highly attractive lower surface.

The lay-in ceiling panel described by this invention has many advantages. First, the combination of the fiber glass ply, gypsum board and highly perforated vinyl lamina results in excellent NR and ST coefficients in the range of 0.85 to 0.95 sabins, and 0.35 to 0.39 decibels respectively. It should be noted that these NR and ST coefficients may also be given in a percentage form such as 85 to 95% or 35 to 39% respectively.

Second, the gypsum board serves as a good fire barrier that will remain in place even if the other materials disintegrate during an actual fire. In fact, when the gypsum board is type x and ⅝ inch thick, the panel can be rated as a 2 hour fire barrier.

In addition, the ceiling panel is able to achieve the above characteristics while remaining inexpensive and space efficient. This advantage is created because gypsum board has good resistance to fire and a large ST coefficient, while being a relatively inexpensive and compact material.

Finally, the gypsum board and fiber glass ply are adhered to each other by beads or droplets of glue which are spaced 1 to 2 inches apart and 4 to 6 inches away from the periphery of the gypsum board. As a result, the gypsum board may warp upwardly around its periphery without disturbing the visible lower layers which continue to lay horizontally flat.

Other advantages and aspects of the invention will become apparent upon making reference to the specification, claims, and drawings to follow.

DETAILED DESCRIPTION OF THE INVENTION

Figure 1:
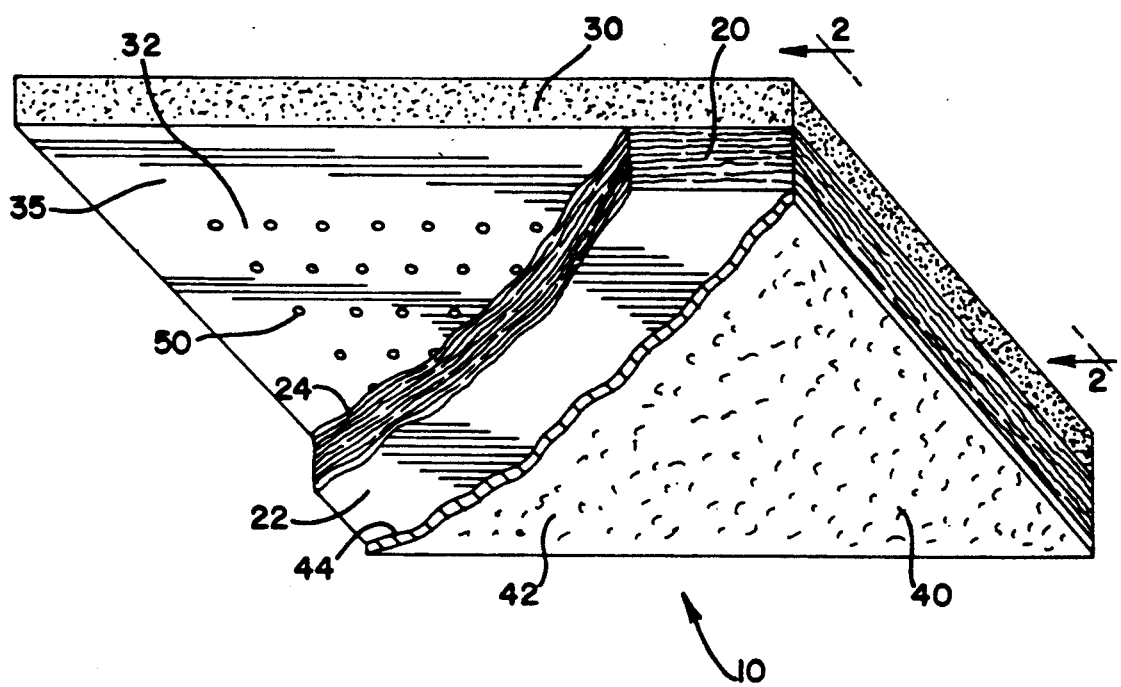
FIG. 1 is a perspective view of a panel with cut away portions to reveal the several layers.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

Figure 2:
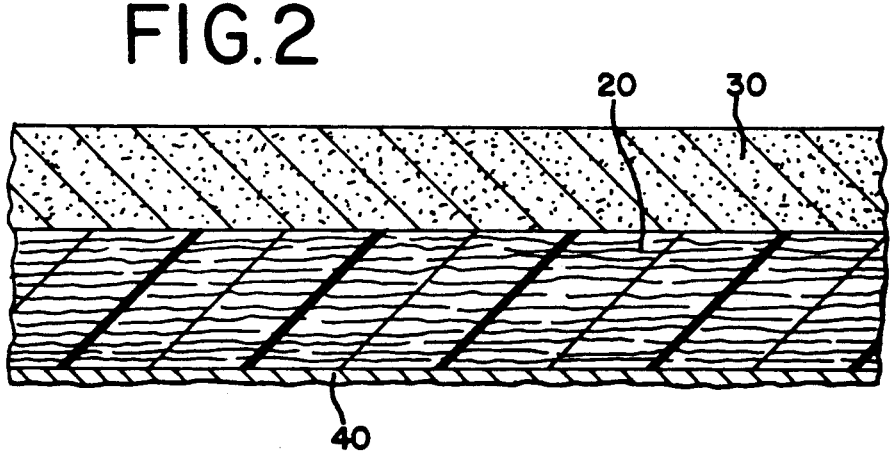
FIG. 2 is a side view of the panel in FIG. 1, taken along line 2—2.

As shown in FIGS. 1 and 2, the present invention is a lay-in ceiling panel 10. In its simplest form, the ceiling panel comprises a glass fiber ply 20 and a gypsum board 30. The glass fiber ply 20 provides the means for absorbing noise, and is available from well known manufacturers such as Johns-Manville and Certainteed. The gypsum board 30 provides a means for resisting sound transmission and fire penetration, and is available from such manufacturers as Georgia Pacific, National Gypsum and U.S. Gypsum.

The preferred embodiment contains an additional highly perforated vinyl lamina 40 providing a washable and highly textured decorative surface which is pleasing to the eye. This lamina 40 is available from General Tire in an unperforated form. Although other thicknesses are obviously possible, the preferred thicknesses of the glass fiber ply 20, gypsum board 30 and vinyl lamina 40 are ⅜ inch, ⅜ inch and 2 millimeters respectively.

Typically the first step in manufacturing the ceiling panel 10 is to secure the vinyl lamina 40 to the glass fiber ply 20. However, the vinyl lamina is manufactured in roles which can be 3,000 feet long. Similarly, the glass fiber ply is manufactured in sheets much larger than the individual ceiling panels will be when they are completed.

Before cutting these materials to the desired panel dimensions, the lamina 40 and ply 20 are glued together to form a unitary product. This can be done by using a roller to apply an even coat of water base adhesive to the backside 42 of the uncut vinyl lamina. The backside 42 of the lamina is then placed against the bottom side 22 of the uncut glass fiber ply and may be heated to a temperature of 140 degrees Fahrenheit for a minute or two to facilitate the drying of the glue. Once dry, a pin role is run over the front side 42 of the vinyl lamina to puncture a plurality of holes through the surface of the lamina, thereby creating the highly perforated surface.

Now the unitary product comprised of the glass fiber ply and the highly perforated vinyl lamina is cut to the desired ceiling panel dimensions. Similarly, the gypsum board is cut to the desired individual ceiling panel size.

Next, a strip coater is used to apply droplets or beads 50 of water based adhesive to the bottom side 32 of the gypsum board 30. By lowering the pressure of the glue inside the strip coater, which is merely a pipe with a single row of holes running longitudinally down the length of the pipe, the glue will be applied in droplet form and not a continuous stream. These droplets of adhesive 50 are applied to the bottom side 32 of the cut gypsum board 30 such that the droplets are spaced 1 to 2 inches apart and 4 to 6 inches away from the outer periphery 35 of the gypsum board 30.

In the last step, the bottom side 32 of the gypsum board is placed against the topside 24 of the glass fiber ply. The gypsum board and glass fiber ply are then aligned so that the sides of the panel 12 are flush. Finally, the glue droplets 50 are allowed to dry.

The completed ceiling panels possess many desireable characteristics. First, the structure of the panel will allow the gypsum board to serves as a fire barrier. For the purpose of maintaining a fire barrier it should be understood that other similar nonflammable materials such as mineral board or plaster board could be used in place of gypsum board 30. In the event of a fire, which can create temperatures of 1700 degrees Fahrenheit, the vinyl lamina 40 and glass fiber ply 20 will quickly disintegrate as their melting temperatures are approximately 140 and 1200 degrees Fahrenheit respectively. As these layers disintegrate, the gypsum board 30 is free to fall into place in the grid-like support structure. Thus, a fire barrier is maintained.

Additionally, the disclosed panel structure provides excellent NR and ST coefficients which are in the range of 0.85 to 0.95 sabins and 0.35 to 0.39 decibels respectively. Consequently, virtually all of the noise which comes in contact with the ceiling panels is absorbed. Moreover, much of the unabsorbed noise is inhibited from being transmitted through the panel. Consequently, virtually all of the noise generated in one room is prevented from passing over a wall into an adjacent room.

Finally, the placement of the water based adhesive droplets 50 allow the vinyl lamina 40 and glass fiber ply 20 to lay horizontally flat even when the outer periphery 34 of the gypsum board 30 warps due to water leaks, humidity, age, etc. Consequently, the useful life of the panel is increased because the visible side 42 of the panel maintains its smooth flat surface. For the purposes of maintaining a horizontally smooth flat surface, it should be understood that gypsum board 30 may be replaced by other suitable materials such as mineral board or plaster board.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details.

What is claimed is:

1. A lay-in ceiling panel structure, comprising a glass fiber ply, and a gypsum board, said gypsum board being secured to said glass fiber ply at spaced locations, said ply remaining horizontally flat even if said board warps during use.

2. The lay-in ceiling panel of claim 1, wherein said gypsum board is secured to said glass fiber ply by adhesive means wherein said adhesive means is applied about 4 to 6 inches away from the outer periphery of said gypsum board.

3. The lay in ceiling panel of claim 2, wherein said gypsum board is secured to said glass fiber ply by adhesive droplet means, wherein said droplets means are spaced about 1 to 2 inches apart.

4. A lay-in ceiling panel structure comprising a glass fiber ply and a gypsum board secured to said glass fiber ply, said gypsum board being adapted to drop down in the support structure to maintain a fire barrier should said glass fiber ply disintegrate during a fire.

5. A lay-in ceiling panel structure, comprising:
   a glass fiber ply having a thickness of approximately ⅜ of an inch,
   a gypsum board having a thickness of approximately ⅜ inch, wherein said gypsum board is secured to said glass fiber ply by glue means, wherein said glue is applied in droplets spaced 1 to 2 inches apart and 4 to 6 inches away from the edge of the gypsum board, and wherein said gypsum board will drop down in the support structure to maintain a fire barrier should said vinyl lamina and said glass fiber ply disintegrate during a fire, and,
   a highly perforated vinyl lamina having a thickness of 2 millimeters secured to said glass fiber ply, wherein said panel has noise and sound transmission reduction coefficients in the range of 0.85 to 0.95 sabins and 0.35 to 0.39 dbs respectively.

* * * * *